US010137832B2

(12) United States Patent
Chen et al.

(10) Patent No.: US 10,137,832 B2
(45) Date of Patent: Nov. 27, 2018

(54) METHODS AND SYSTEMS FOR CONTROLLING LIGHT

(71) Applicant: GM GLOBAL TECHNOLOGY OPERATIONS LLC, Detroit, MI (US)

(72) Inventors: Houli Chen, Shang Hai (CN); Li Shen, Shang Hai (CN); Jie Zhu, Shang Hai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 5 days.

(21) Appl. No.: 15/464,496

(22) Filed: Mar. 21, 2017

(65) Prior Publication Data

US 2018/0272932 A1 Sep. 27, 2018

(51) Int. Cl.

| | |
|---|---|
| *B60Q 1/14* | (2006.01) |
| *B60Q 3/80* | (2017.01) |
| *H05B 33/08* | (2006.01) |
| *B60Q 3/76* | (2017.01) |
| *B60Q 3/18* | (2017.01) |
| *B60Q 3/82* | (2017.01) |
| *H05B 37/02* | (2006.01) |

(52) U.S. Cl.
CPC ............... *B60Q 3/80* (2017.02); *B60Q 1/143* (2013.01); *B60Q 1/1423* (2013.01); *B60Q 1/1446* (2013.01); *B60Q 3/18* (2017.02); *B60Q 3/76* (2017.02); *B60Q 3/82* (2017.02); *H05B 33/0851* (2013.01); *H05B 33/0857* (2013.01); *H05B 37/0218* (2013.01); *H05B 37/0227* (2013.01)

(58) Field of Classification Search
CPC ............ H05B 37/0218; H05B 37/0227; B60Q 1/1423; B60Q 1/143; B60Q 1/1446

USPC .......................... 315/77, 82; 307/10.1, 10.8
See application file for complete search history.

(56) References Cited

U.S. PATENT DOCUMENTS

| 8,408,766 B2* | 4/2013 | Wilson | B60Q 3/68 362/496 |
|---|---|---|---|
| 2010/0141556 A1* | 6/2010 | Moliton | G02B 27/0149 345/8 |

(Continued)

OTHER PUBLICATIONS

Marjukka, E. et al., "MOVE—Performance based model for mesopic photometry," Helsinki University of Technology Lighting Laboratory. Report nro 35, Espoo, Finland 2005. Project funded by the European Community under the Competitive and Sustainable Growth' Programme (1998-2002). Project duration: 2002-2004.

*Primary Examiner* — Tung X Le
(74) *Attorney, Agent, or Firm* — Lorenz & Kopf, LLP (57) ABSTRACT

Systems, vehicles, and methods for controlling light are provided. In an exemplary embodiment a vehicle with a cabin includes a light senor positioned within the vehicle, where the light sensor is configured to send a light intensity signal. A lamp module is positioned within the vehicle, where the light sensor is in communication with lamp module. The lamp module is configured to trigger a darkness lighting scheme when the light intensity signal is at about a darkness set value or less. A lamp is positioned within the cabin, where the lamp is in communication with the lamp module. The lamp is configured to emit a darkness spectrum when the lamp is activated and when the lamp module triggers the darkness lighting scheme. The darkness spectrum has a maximum illumination wavelength less than about 555 nanometers.

15 Claims, 4 Drawing Sheets

(56) References Cited

U.S. PATENT DOCUMENTS

| | | | | |
|---|---|---|---|---|
| 2015/0137961 A1* | 5/2015 | Bean | B60Q 11/005 | |
| | | | 340/431 | |
| 2015/0138789 A1* | 5/2015 | Singer | B60Q 3/74 | |
| | | | 362/510 | |
| 2015/0375677 A1* | 12/2015 | Salter | B62D 1/06 | |
| | | | 362/510 | |
| 2017/0232884 A1* | 8/2017 | Watase | B60Q 1/0076 | |
| | | | 315/82 | |
| 2017/0297490 A1* | 10/2017 | Lynam | B60R 1/00 | |
| 2017/0334342 A1* | 11/2017 | Dellock | B60Q 1/24 | |

* cited by examiner

METHODS AND SYSTEMS FOR CONTROLLING LIGHT

INTRODUCTION

The technical field generally relates to methods and systems for controlling visible light, and more particularly for controlling visible light to improve vision in low light conditions.

Visible light is electromagnetic radiation with a wavelength of from about 390 to about 700 nanometers (nm), and visible light is often referred to simply as "light." This range of wavelengths correspond to a frequency range of from about 430 to about 770 terahertz (tHz). The term "spectrum," as used herein refers to a range of electromagnetic radiation, especially a range of electromagnetic radiation within the visible light region. The human eye detects visible light, but does not detect electromagnetic radiation with wavelengths outside of the visible light spectrum. The eyes of different people may detect slightly different visible light spectrums, so the exact wavelengths that are visible may vary somewhat from one individual to another.

Many lighting systems provide light with a maximum illumination wavelength of about 555 nm, because the human eye tends to perform best with light having the maximum illumination wavelength of about 555 nm under daylight conditions. However, the human eye performs differently during low light conditions. The human eye includes rods and cones in the retina that detect light, and the rods are primarily responsible for detecting light at low light conditions (scotopic vision). The rods do not generally provide color vision. The cones are active at higher light levels (photopic vision), and are capable of providing color vision. In the scotopic vision area, human eyes perform better with light having the maximum illumination wavelength of about 505 nm. Light with a higher maximum illumination wavelength tends to have more blue light and more ultraviolet light, and higher intensities of blue and ultraviolet light are more damaging to the human eye than light with lower intensities of blue and ultraviolet light. The pupil is larger in low light conditions, so in low light conditions it is possible that higher percentages of the damaging blue and ultraviolet light that contact the cornea actually enters the eye through the pupil to impinge on the retina. Furthermore, light with a higher maximum illumination wavelength, such as a maximum illumination wavelength of about 555 nm, tends to cause more dazzle and glare than light with a lower maximum illumination wavelength.

Accordingly, it is desirable to develop systems and methods to control light, including the maximum illumination wavelength, to improve vision. In addition, it is desirable to develop vehicles, systems, and methods that provide light with a maximum illumination wavelength of less than about 555 nm when in low light conditions. Furthermore, other desirable features and characteristics of the present invention will become apparent from the subsequent detailed description of the invention and the appended claims, taken in conjunction with the accompanying drawings and the background of the invention.

SUMMARY

Systems, vehicles, and methods for controlling light are provided. In an exemplary embodiment a vehicle with a cabin includes a light senor positioned within the vehicle, where the light sensor is configured to send a light intensity signal. A lamp module is positioned within the vehicle, where the light sensor is in communication with lamp module. The lamp module is configured to trigger a darkness lighting scheme when the light intensity signal is at about a darkness set value or less. A lamp is positioned within the cabin, where the lamp is in communication with the lamp module. The lamp is configured to emit a darkness spectrum when the lamp is activated and when the lamp module triggers the darkness lighting scheme. The darkness spectrum has a maximum illumination wavelength less than about 555 nanometers.

A system for controlling light is provided in another embodiment. The system includes an occupant space and a light sensor positioned within the occupant space, where the light sensor is configured to send a light intensity signal. A lamp module is in communication with the light sensor, where the lamp module is configured to trigger a darkness lighting scheme when the light intensity signal is about a darkness set value or less. A lamp is in communication with the lamp module, where the lamp is configured to emit a darkness spectrum when the lamp is activated and when the lamp module triggers the darkness lighting scheme. The darkness spectrum has a maximum illumination wavelength of about 505 nanometers.

A method of controlling light is provided in yet another embodiment. The method includes determining when an ambient light intensity in an occupant space, and then setting an illumination spectrum in the occupant space. A lamp emits a daylight spectrum if the ambient light intensity is greater than a darkness set value, and the lamp emits a darkness spectrum if the ambient light intensity is about equal to or less than the darkness set value. The daylight spectrum is different than the darkness spectrum.

BRIEF DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
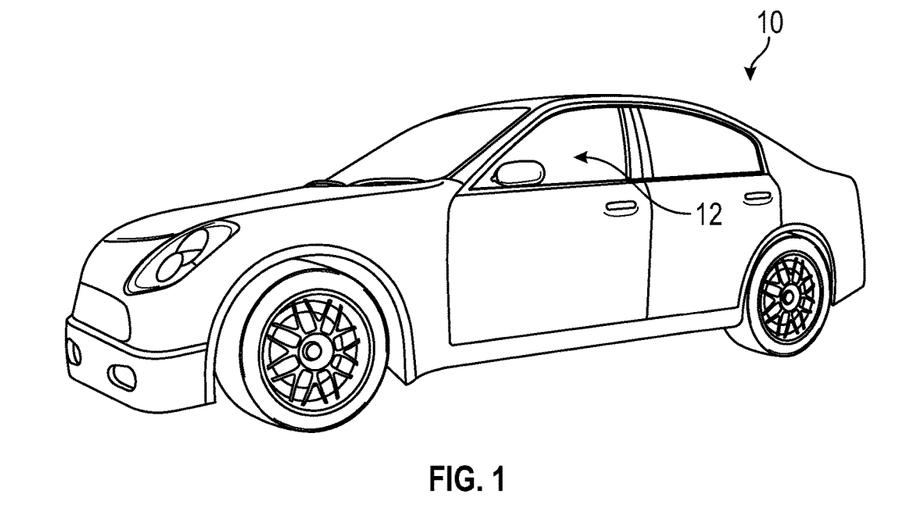
FIG. 1 illustrates an exemplary vehicle.

Reference is made to an exemplary embodiment in FIG. 1. A vehicle 10 is provided, wherein the vehicle has a cabin 12 configured for occupation by people. The vehicle 10 is driven at night or at twilight in some embodiments. Night driving involves low light conditions or twilight conditions, where the ambient light is less than that present during periods when the sun is up and visible. "Low light conditions," as defined herein, include periods when the ambient light has an intensity of about 0.001 candela per square meter ($cd/m^2$) or less, "high light conditions" are defined herein are periods when the ambient light has an intensity of about 3 $cd/m^2$ or more, and "twilight conditions" are when the ambient light has an intensity of from less than about 3 cd/m² or less to about more than 0.001 cd/m². "Ambient" light is the light present at the location of interest, so ambient light includes natural and artificial light if both are present at the location of interest. High light conditions are photopic periods, and the cones in the retina act as the main receptor for vision. Photopic conditions tend to be associated with pupil constriction, smaller fields of view, and good visual detection of color and details of objects. Low light conditions are scotopic periods, and the rods in the retina act as the main receptor for vision. Scotopic conditions tend to be associated with pupil dilation, larger fields of view, and visual detection of contours of an object without detection of finer details. Color detection is often lacking during scotopic conditions. Twilight conditions are mesopic periods, when both the rods and cones function.

Figure 2:
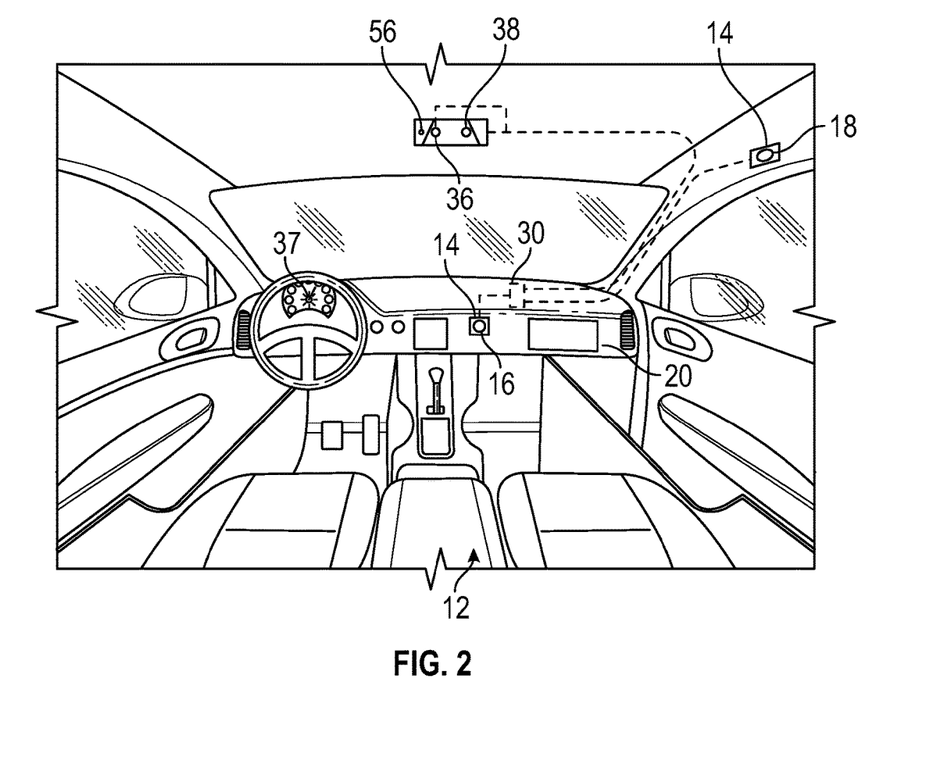
FIG. 2 illustrates an exemplary cabin of a vehicle.

Referring to an exemplary embodiment in FIG. 2, with continuing reference to FIG. 1, the cabin 12 includes a light sensor 14 that is positioned and configured to detect the intensity of light present in the cabin 12. The light sensor 14 is one or more of an inside light sensor 16 and an outside light sensor 18, where the generic term "light sensor" refers to either or both of the inside and outside light sensors 16, 18. Several different types of light sensors 14 are available, including but not limited to photocells, photoresistors, and charged coupling devices. The light sensor 14 is configured to detect the intensity of the ambient light at a variety of different wavelengths in some embodiments, so the light sensor 14 provides a light intensity signal for the intensity at a plurality of wavelengths. For example, the light sensor provides the intensity of light at 450 nm, at 500 nm, at 550 nm, at 600 nm, at 650 nm, and at 700 nm. In an alternate embodiment, the light sensor 14 sends a light intensity signal that indicates the intensity of light in the visible spectrum, so all the visible light wavelengths are combined in the light intensity signal and no information is provided for the intensity of light at specific wavelengths within the visible spectrum. In yet another embodiment, the light sensor 14 detects electromagnetic radiation within a set wavelength range that may be different than the range of wavelengths in the visible spectrum, and the light intensity signal is used to represent visible light even though the range of wavelengths detected is not exactly the same as that of the visible spectrum.

In one embodiment, the inside light sensor 16 is mounted on a dash board 20 in the cabin 12, as illustrated in FIG. 2, but in alternate embodiments the inside light sensor 16 is mounted on the roof of the cabin 12, in a door of the cabin 12, or in other locations. In the embodiment illustrated in FIG. 2 there is a single inside light sensor 16, but in alternate embodiments there are more than one inside light sensors 16 mounted within the cabin. One or more outside light sensors 18 are provided in some embodiments, where the outside light sensors 18 are positioned and configured to detect the intensity of light outside of the cabin 12. The outside light sensor(s) 18 are positioned in one or more of several locations, including but not limited to a fender, the roof, or a side panel.

The light sensor 14 is in communication with a lamp module 30, where the lamp module 30 is positioned within the vehicle 12. The light sensor 14 communicates with the lamp module 30 through a wire, an optical cable, or another physical connection in many embodiments, but in alternate embodiments the light sensor 14 communicates with the lamp module 30 wirelessly, such as with radio waves. Reference is made to exemplary embodiment in FIG. 3, with continuing reference to FIGS. 1 and 2. The lamp module 30 includes any combination of hardware and software configured to control a lamp (described below.) In various embodiments the lamp module 30 includes any type of processor 32 or multiple processors 32, integrated circuits such as a microprocessor, or any suitable number of integrated circuit devices and/or circuitry working in cooperation to accomplish the tasks of the lamp module 30. The lamp module 30 executes one or more programs that are be stored within a lamp module memory 34 in an exemplary embodiment. In one example, the lamp module memory 34 saves various other data as well, such as information for other processes within the vehicle 12. In various embodiments, the lamp module 30 includes, or has access to, any type of lamp module memory 34, including but not limited to random access memory (RAM), read only memory (ROM), erasable programmable read only memory (EPROM), electrically erasable programmable read only memory (EEPROM), and non-volatile random access memory (NVRAM).

Figure 3:
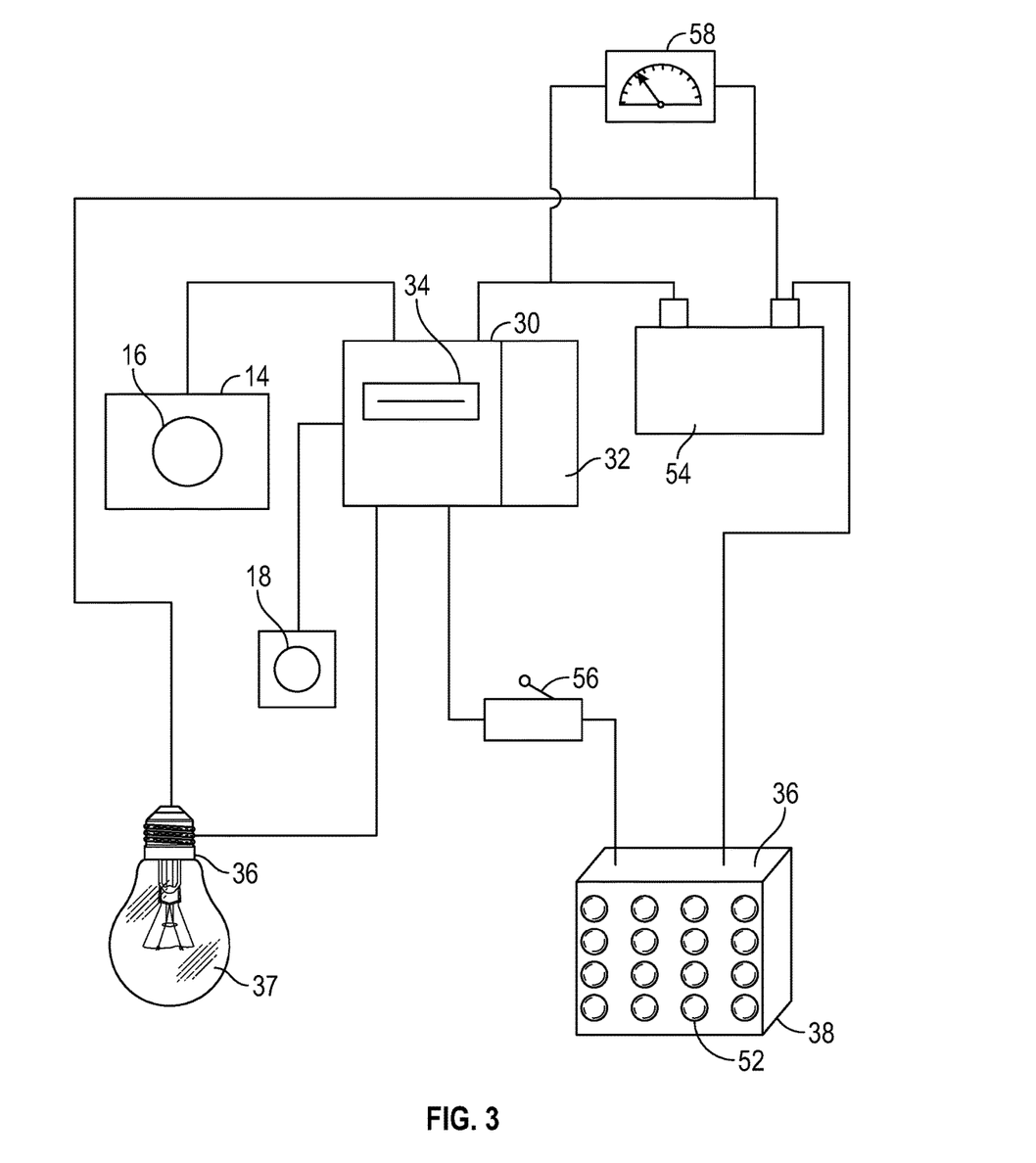
FIG. 3 is a schematic drawing of an exemplary lighting system.

The lamp module 30 is in communication with a lamp 36 that is positioned with the cabin 12 and configured to shine light within the cabin 12. The lamp module 30 is configured to trigger a darkness lighting scheme when the light intensity signal from the light sensor 14 indicates a low light condition. The ambient light is at a low light condition when the light sensor signal indicates the ambient light is at or below a darkness set value. The darkness set value is adjustable in some embodiments, but the darkness set value is fixed in alternate embodiments. In an exemplary embodiment, the darkness set value is about 0.001 cd/m² but other values are also possible, such as about 0.002 cd/m², about 0.005 cd/m², about 0.01 cd/m², or other values. In an optional embodiment, the lamp module 30 triggers a twilight lighting scheme when the light sensor 14 indicates the ambient light is in a twilight range. The lamp module 30 is configured to determine the ambient light is in a twilight range when the light intensity signal indicates the ambient light is at about a twilight set value or less and greater than the darkness set value. Various twilight set values are possible in different embodiments, but an exemplary twilight set value is about 3 cd/m². In yet another optional embodiment, the lamp module 30 is configured to determine the ambient light is in a daylight range when the light intensity signal indicates the ambient light is greater than the darkness set value (for embodiments where there is no twilight range), or where the ambient light is greater than the twilight set value for embodiments where there is a twilight range. In embodiments with a daylight range, the lamp module 30 triggers a daylight lighting scheme when the ambient light is in the daylight range. In other embodiments, the lamp module 30 triggers additional lighting schemes at additional set values.

Figure 4:
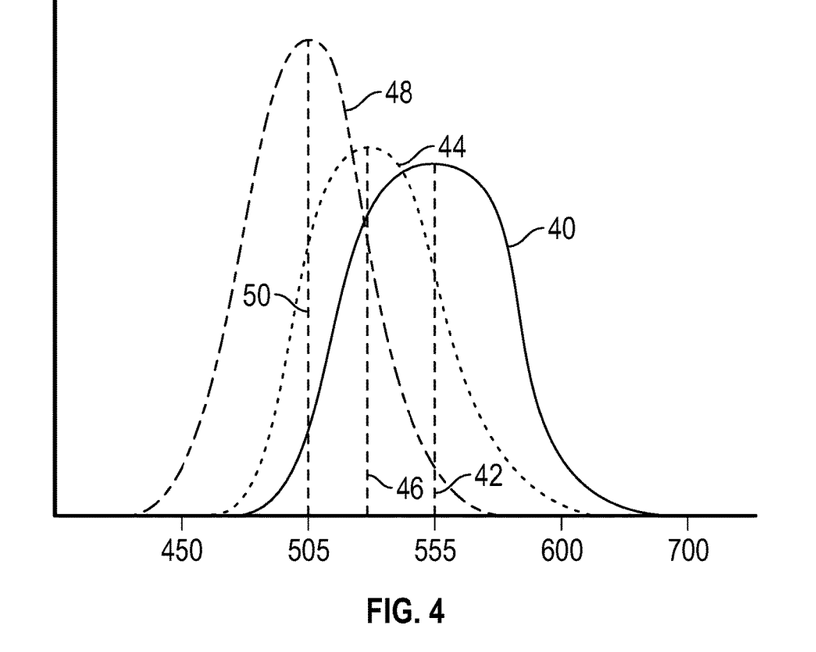
FIG. 4 graphically represents exemplary light spectrums.

A plot of light lumens, or light intensity, against wavelength generally forms a bell curve with a peak at the maximum illumination wavelength, as illustrated in FIG. 4 with continuing reference to FIGS. 1-3. In some embodiments (not illustrated) light has two or more peaks where the highest peak is the maximum illumination wavelength. Three different plots are illustrated, where one represents a daylight spectrum 40 with a daylight spectrum maximum illumination wavelength 42 of about 555 nm. Reference herein to the maximum illumination wavelength being "about" a specific wavelength means the exact maximum illumination wavelength is within about 10 nm of the referenced wavelength in some embodiments, or within about 5 nm or within about 2 nm in alternate embodiments. The exact maximum illumination wavelength for the lamp 36 may vary somewhat, such as with temperature, age of the lamp 36, etc. A twilight spectrum 44 has a twilight maximum illumination wavelength 46 that is between about 555 nm and about 505 nm, and a darkness spectrum 48 has a darkness spectrum maximum illumination wavelength 50 of about 505 nm. Other maximum illumination wavelengths are possible for the daylight spectrum, the twilight spectrum, the darkness spectrum, and additional spectrums in alternate embodiments. Referring back to FIGS. 2 and 3 with continuing reference to FIGS. 1 and 4, the lamp 36 emits the daylight spectrum 40 when the lamp module 30 triggers the daylight lighting scheme, and the lamp 36 emits the darkness spectrum 48 when the lamp module 30 triggers the darkness lighting scheme. In optional embodiments, the lamp 36 emits the twilight spectrum 44 when the lamp module 30 triggers the twilight lighting scheme, and the lamp 36 emits additional spectrums when the lamp module 30 triggers additional lighting schemes. In an exemplary optional embodiment, the twilight lighting scheme includes a sliding value for the twilight maximum illumination wavelength 46, depending on the specific light sensor signal, where the twilight maximum illumination wavelength 46 is between the daylight and darkness maximum illumination wavelengths 42, 50.

In an exemplary embodiment, the lamp 36 is a controllable lamp 36 where the maximum illumination wavelength of the lamp 36 can be controlled. In one example, the lamp 36 includes a plurality of light emitting diodes 52 (LEDs), where the plurality of LEDs 52 include LEDs 52 that emit light at different wavelengths. The maximum illumination wavelength of the lamp 36 is controlled by adjusting the power provided to the different LEDs 52, with more power provided to the LEDs 52 at or near the desired maximum illumination wavelength and less power provided to the LEDs 52 that emit light that is further away from the desired maximum illumination wavelength. Other types of controllable lamps 36 are utilized in alternate embodiments, such as lamps 36 with variable colored filters (not illustrated).

In an alternate embodiment, the lamp 36 is not controllable, and the lamp 36 is configured to emit the darkness spectrum 48 whenever the lamp 36 is activated. In one example, the lamp 36 is a reading lamp within the vehicle 10, so the lamp 36 is primarily needed during dark periods. In this example, there is little benefit to controlling the light emitted by the lamp 36 to the daylight spectrum 40 or the twilight spectrum 44, so the lamp 36 that only emits the darkness spectrum 48 provides a benefit to passengers of the vehicle 10. In some embodiments where the lamp 36 is not controllable, and the lamp 36 only emits the darkness spectrum 48, the lamp module 30 is omitted so the lamp 36 emits the darkness spectrum 48 whenever it is activated.

A lamp power supply 54 is positioned within the vehicle 10, and the lamp power supply is electrically connected to the lamp 36. The lamp power supply 54 provides the power for lighting the lamp 36. In an exemplary embodiment, the lamp power supply 54 is a battery, but the lamp power supply 54 is a capacitor, a fuel cell, or another type of power supply in alternate embodiments. The lamp power supply 54 is electrically connected to the lamp 36 through the lamp module 30 in some embodiments, as illustrated, but the lamp power supply 54 bypasses the lamp module 30 to connect to the lamp 36 in other embodiments. The lamp 36 is part of a circuit that includes the lamp power supply 54.

A toggle switch 56 is connected to the lamp 36 in some embodiments. In one example, the toggle switch 56 activates the lamp 36, and the lamp 36 emits the spectrum that correlates to the lighting scheme triggered by the lamp module 30. As such, the lamp 36 emits light according to instructions from the lamp module 30 once the lamp is activated. In an exemplary embodiment, the lamp 36 does not light when the toggle switch 56 is open and deactivates the lamp 36. As such, the lamp 36 is configured to emit the desired spectrum (daylight, twilight, or darkness spectrum 40, 44, 48) triggered by the lamp module 30 when the lamp 36 is activated. In an alternate embodiment, the lamp 36 is activated by the lamp module 30, so the activation and the desired spectrum are controlled by the lamp module 30. In yet another embodiment, two or more toggle switches 56 are used to activate the lamp 36 and/or the lamp module 30 in a wide variety of manners. The lamp module 30 includes several factors that influence how the lamp 36 operates in some embodiments. In one example, the lamp 36 is a reading lamp within a vehicle 10, and the lamp module 30 activates the lamp 36 when a door is opened. A dash light is one possible example of an embodiment with no toggle switch 56 where the lamp module 30 controls activation of the lamp 36.

There may be more than one lamp 36, as mentioned above, and different lamps 36 are configured differently within the vehicle 10 in some embodiments. In an exemplary embodiment, the lamp 36 includes a dash lamp 37 and a reading lamp 38. In this example, the dash lamp 37 is not a controllable lamp 36, and the lamp module 30 is configured to trigger the darkness lighting scheme for the dash lamp 37 when the outside light sensor 18 is about the darkness set value or less. The lamp module 30 is configured to trigger a daylight lighting scheme and/or a twilight lighting scheme for additional lamps 36 that are not controllable and that are configured to produce the daylight spectrum 40 and/or the twilight spectrum 44, respectively, depending on the light intensity signal from the outside light sensor 18. In this example, the reading lamp 38 is a controllable lamp 36, and the lamp module 30 is configured to trigger the darkness lighting scheme for the reading lamp 38 when the inside light sensor 16 provides a light intensity signal that is at about the darkness set value or less. Many other examples are possible.

The lamp 36 provides illumination in the darkness spectrum 48 during low light periods, as described above. The human eye operates more efficiently with the darkness spectrum 48 during low light periods, so glare and dazzle are reduced. During low light periods, such as when the ambient light is about 0.001 cd/m$^2$ or less, the human eye actually performs better with lower intensities in the darkness spectrum 48 than with higher intensities in the daylight spectrum 50. Therefore, less intensity is needed to illuminate the lamp 36, and vision is enhanced. Accordingly, in some embodiments the power provided from the lamp power supply 54 to the lamp 36 is reduced compared to the power provided from the lamp power supply 54 to a lamp 36 intended for use during daylight periods. In an exemplary embodiment, the power provided to the lamp 36 in the darkness lighting scheme is limited to about 2 watts or less. The reduced power supplied to the lamp 36 reduces the drain on the lamp power supply 54 (which is used for other purposes beside powering the lamp in some embodiments), and the lower light intensity eases the strain on the eyes. A power supply control unit 58 is used to control and limit the power supplied to the lamp 36 in some embodiments. The power supply control unit 58 is a resistor in an exemplary embodiment, but in alternate embodiments the power supply control unit 58 is one or more of an integrated circuit, a regulator, or other power supply control devices. In an alternate embodiment, the lamp power supply 54 is integrated into the lamp module 30, and the lamp 36 is controlled and powered by the lamp module 30.

Figure 5:
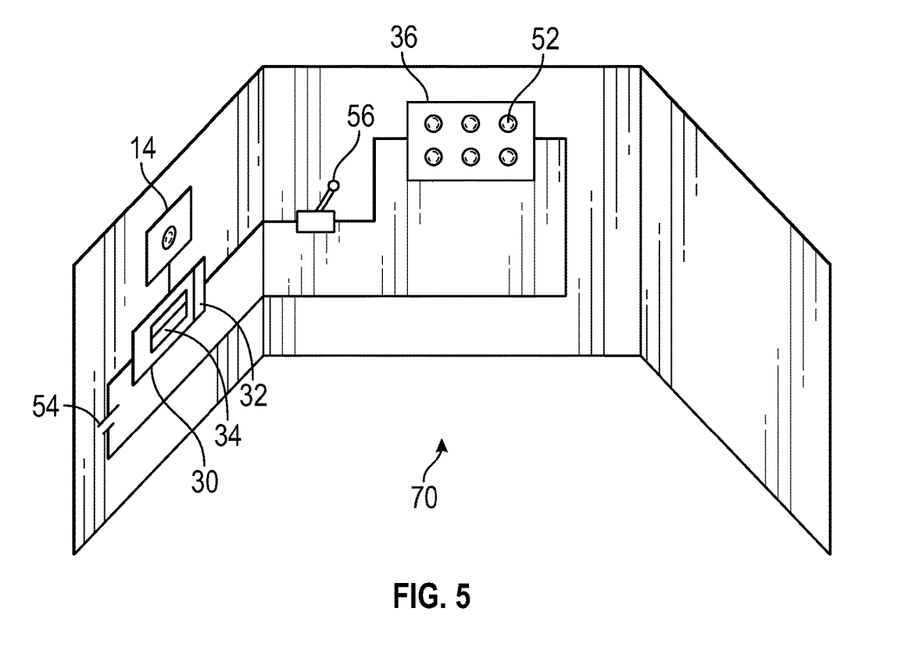
FIG. 5 illustrates an exemplary occupant space with a lighting control system.

In some embodiments, the system for controlling light described above is used for purposes other than a vehicle 10, as illustrated in FIG. 5. The light control system is used for controlling light in an occupant space 70, such as room in a house or a business in an exemplary embodiment. The occupant space 70 is a cabin 12 of a vehicle 10 in another embodiment, as described above, and in other embodiments the occupant space 70 is another location configured for occupation by a person. The light control system includes the light sensor 14, the lamp module 30, the lamp power supply 54, and the lamp 36 as described above. The lamp 36 and light sensor 14 are located in the occupant space 70 where controlled lighting is desired. In some embodiments, the lamp module 30 and/or the lamp power supply 54 are located outside of the occupant space 70 but are connected to the lamp 36 and/or light sensor 14, such as with one or more wires. The lamp module 30 and/or lamp power supply 54 are located within the occupant space 70 in some embodiments. The optional toggle switch 56 or other optional components described above are incorporated into the light control system for controlling the light as desired, in a similar manner to that described above.

Figure 6:
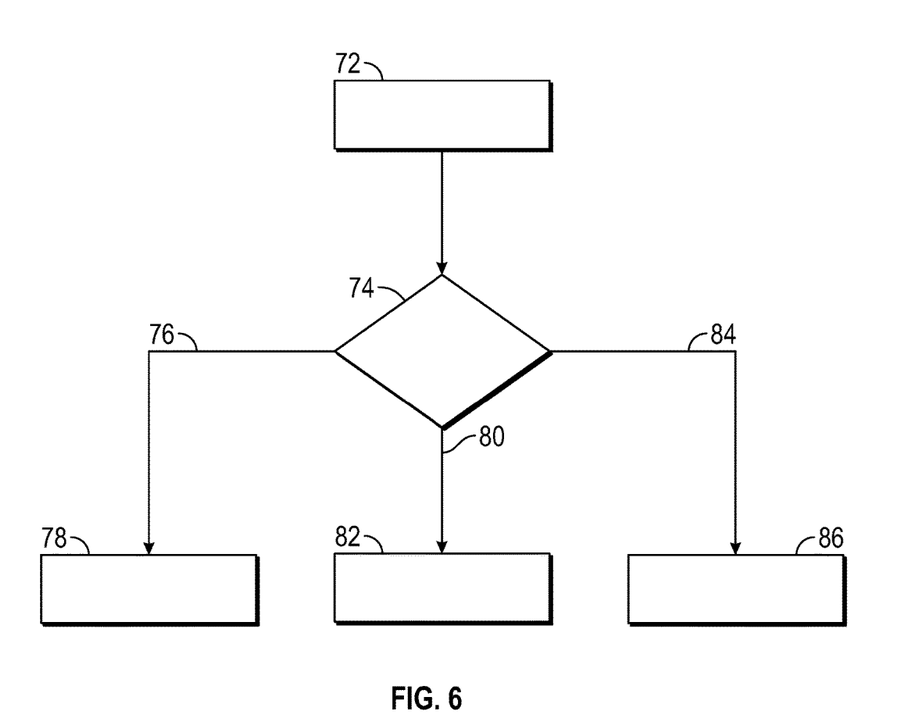
FIG. 6 illustrates an exemplary method for controlling light.

Reference is made to FIG. 6, with continuing reference to FIGS. 1-5. In one embodiment, the light control system (1) determines the ambient light 72 in an occupant space 70, such as with the light sensor 14. A lamp module 30 then (2) sets the illumination spectrum 72 for the occupant space 70. If (a) the ambient light is about equal to or less than a darkness set point 76, then (3) the lamp 36 emits a darkness spectrum 78. If (b) the ambient light is about equal to or greater than a twilight set point 80, then (4) the lamp 36 emits a daylight spectrum 82. If (c) the ambient light is about between the darkness set point 76 and the twilight set point 80, then (5) the lamp 36 emits a twilight spectrum 86, as described in greater detail above. In an alternate embodiment, the lamp 36 emits a darkness spectrum 48 or a daylight spectrum 40 depending on whether the ambient light is above or below the darkness set point 76, and there is no twilight determination and no emitting of the twilight spectrum 86. Also as described above, the maximum illumination spectrum for the darkness spectrum 48 is less than daylight spectrum 40. The maximum illumination wavelengths of the illumination spectrums are as described above.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A vehicle comprising:
 a cabin;
 a light sensor positioned within the vehicle, wherein the light sensor is configured to send a light intensity signal;
 a lamp module positioned within the vehicle, wherein the light sensor is in communication with the lamp module, wherein the lamp module is configured to trigger a darkness lighting scheme when the light intensity signal is at about a darkness set value or less, and wherein the lamp module is configured to trigger a daylight lighting scheme when the light intensity signal is greater than the darkness set value; and
 a lamp positioned within the cabin, wherein the lamp is in communication with the lamp module, wherein the lamp is configured to emit a darkness spectrum when the lamp is activated and when the lamp module triggers the darkness lighting scheme, wherein the darkness spectrum has a maximum illumination wavelength that is less than about 555 nanometers, wherein the lamp is configured to emit a daylight spectrum when the lamp is activated and when the lamp module triggers the daylight lighting scheme, and wherein the maximum illumination wavelength of the daylight spectrum is different than the maximum illumination wavelength of the darkness spectrum.

2. The vehicle of claim 1, further comprising:
 a toggle switch, wherein the lamp is activated and deactivated by the toggle switch.

3. The vehicle of claim 1, further comprising a lamp power supply electrically connected to the lamp, wherein the lamp power supply provides a maximum of about 2 watts of power to the lamp.

4. The vehicle of claim 1, wherein the lamp comprises a controllable lamp, wherein the maximum illumination wavelength of the lamp is to be controlled.

5. The vehicle of claim 1, wherein:
 the maximum illumination wavelength of the daylight spectrum is about 555 nanometers.

6. The vehicle of claim 1, wherein the darkness set value is about 0.001 candela per square meter.

7. The vehicle of claim 1, wherein the maximum illumination wavelength of the darkness spectrum is about 505 nanometers.

8. The vehicle of claim 1, wherein:
 the light sensor comprises a cabin sensor and an external sensor, wherein the cabin sensor is positioned within the cabin and the external sensor is positioned to sense light exterior to the vehicle;
 the lamp comprises a reading lamp and a dash lamp;
 the lamp module is configured to trigger the darkness lighting scheme for the dash lamp when the light intensity signal from the external sensor is at about the darkness set value or less; and
 the lamp module is configured to trigger the darkness lighting scheme for the reading lamp when the light intensity signal from the cabin sensor is at about the darkness set value or less.

9. The vehicle of claim 1, wherein:
 the lamp module is configured to trigger a twilight lighting scheme when the light intensity signal is greater than the darkness set value and about equal to or less than a twilight set value; and
 wherein the lamp is configured to emit a twilight spectrum when the lamp is activated and when the lamp module triggers the twilight lighting scheme, and wherein the maximum illumination wavelength of the twilight spectrum is between about 505 nanometers and about 555 nanometers.

10. The vehicle of claim 9, wherein the twilight set value is about 3 candela per square meter.

11. A system for controlling light comprising:
 an occupant space configured for occupation by a person;
 a light sensor positioned within the occupant space, wherein the light sensor is configured to send a light intensity signal;

a lamp module in communication with the light sensor, wherein the lamp module is configured to trigger a darkness lighting scheme when the light intensity signal is about a darkness set value or less, and wherein the lamp module is configured to trigger a daylight lighting scheme when the light intensity signal is greater than the darkness set value; and a lamp in communication with the lamp module, wherein the lamp is configured to emit a darkness spectrum when the lamp is activated and when the lamp module triggers the darkness lighting scheme, wherein the darkness spectrum has a maximum illumination wavelength of about 505 nanometers, wherein the lamp is configured to emit a daylight spectrum when the lamp is activated and when the lamp module triggers the daylight lighting scheme, and wherein the maximum illumination wavelength of the daylight spectrum is different than the maximum illumination wavelength of the darkness spectrum.

12. The system of claim 11, further comprising:

a toggle switch, wherein the lamp is activated and deactivated by the toggle switch.

13. The system of claim 11, wherein:

the maximum illumination wavelength of the daylight spectrum is about 555 nanometers.

14. The system of claim 11, wherein the lamp comprises a plurality of light emitting diodes (LEDs), wherein the plurality of LEDs comprise LEDs that emit different wavelengths, and wherein power provided to each of the plurality of LEDs is to be varied to change the maximum illumination wavelength of the lamp.

15. The system of claim 11, further comprising:

a lamp power supply configured to provide electricity to the lamp, wherein the lamp power supply provides a maximum of about 2 watts of power to the lamp.

* * * * *